United States Patent
Fortusini et al.

(10) Patent No.: US 9,645,325 B2
(45) Date of Patent: May 9, 2017

(54) EXPANDED-BEAM FERRULE WITH HIGH COUPLING EFFICIENCY FOR OPTICAL INTERFACE DEVICES

(71) Applicant: CORNING OPTICAL COMMUNICATIONS LLC, Hickory, NC (US)

(72) Inventors: Davide Domenico Fortusini, Ithaca, NY (US); Andrey Kobyakov, Hickory, NC (US); Xue Liu, Advance, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/701,600

(22) Filed: May 1, 2015

(65) Prior Publication Data

US 2016/0320569 A1 Nov. 3, 2016

(51) Int. Cl.
*G02B 6/38* (2006.01)
*G02B 6/32* (2006.01)

(52) U.S. Cl.
CPC ............. *G02B 6/3853* (2013.01); *G02B 6/32* (2013.01); *G02B 6/3818* (2013.01); *G02B 6/3838* (2013.01); *G02B 6/3882* (2013.01); *G02B 6/3885* (2013.01)

(58) Field of Classification Search
CPC .................................................. G02B 6/3853
See application file for complete search history.

(56) References Cited

U.S. PATENT DOCUMENTS

| | | | |
|---|---|---|---|
| 4,290,667 A * | 9/1981 | Chown | G02B 6/2817 264/1.25 |
| 4,893,890 A | 1/1990 | Lutes | 350/96.18 |
| 5,241,612 A * | 8/1993 | Iwama | G02B 6/32 385/59 |
| 5,481,634 A | 1/1996 | Anderson et al. | 385/76 |
| 6,234,683 B1 | 5/2001 | Waldron et al. | 385/78 |
| 6,438,290 B1 | 8/2002 | Bietry et al. | |
| 6,632,025 B2 * | 10/2003 | Ukrainczyk | G02B 6/262 385/70 |

(Continued)

FOREIGN PATENT DOCUMENTS

EP 0150860 1/1992

OTHER PUBLICATIONS

Chuang et al., "Development and Qualification of a Mechanical-Optical Interface for Parallel Optics Links", Photonics West Optical Interconnects XV, Pro. SPIE 9368, 936827 (2015).*

(Continued)

*Primary Examiner* — Michelle R Connelly (57) ABSTRACT

An expanded-beam ferrule for an optical interface device has a ferrule body with a fiber support feature that supports an optical fiber. The ferrule body defines a lens having a planar back surface and a convex and aspheric front surface. The lens has a select amount of on-axis spherical aberration that gives rise to an improved coupling efficiency and in particular provided tolerance to misalignments between confronting expanded-beam ferrules used in an expanded-beam optical interface device. The ferrule body can also include multiple lenses and can support multiple optical fibers in operable alignment thereto.

20 Claims, 10 Drawing Sheets

(56) References Cited

U.S. PATENT DOCUMENTS

| | | | |
|---|---|---|---|
| 6,655,850 B2 | 12/2003 | Mann et al. | 385/74 |
| 7,460,750 B2 | 12/2008 | Durrant et al. | 385/35 |
| 7,474,822 B2 | 1/2009 | Kobayashi et al. | 385/35 |
| 7,985,026 B1* | 7/2011 | Lin | G02B 6/32 385/55 |
| 8,292,515 B2* | 10/2012 | Liao | G02B 6/322 385/52 |
| 8,388,236 B2* | 3/2013 | Wu | G02B 6/3845 385/53 |
| 8,408,809 B2* | 4/2013 | Lin | B29C 45/2628 385/33 |
| 8,434,949 B2* | 5/2013 | Wang | G02B 6/32 385/53 |
| 8,565,562 B2* | 10/2013 | Ko | G02B 6/32 385/15 |
| 8,662,758 B2* | 3/2014 | Huang | G02B 6/3895 385/52 |
| 8,675,284 B2 | 3/2014 | Kadar-Kallen | 359/664 |
| 9,004,777 B2* | 4/2015 | Wu | G02B 6/32 385/74 |
| 9,213,146 B2* | 12/2015 | Huang | G02B 6/3831 |
| 2009/0154884 A1 | 6/2009 | Chen et al. | |
| 2010/0027943 A1 | 2/2010 | Armani et al. | 385/74 |
| 2012/0093462 A1* | 4/2012 | Childers | G02B 6/3831 385/33 |
| 2013/0272658 A1 | 10/2013 | Floris et al. | 385/60 |
| 2013/0322821 A1 | 12/2013 | Grinderslev | 385/33 |
| 2015/0104135 A1 | 4/2015 | Bushnell et al. | |

OTHER PUBLICATIONS

Marcuse, D. "Loss analysis of single-mode fiber splices." Bell Syst. Tech. J 56.5 (1977): 703-718.

Gloge, D. "Offset and tilt loss in optical fiber splices." *Bell Syst. Tech. J* 55.7 (1976): 905-916.

Chuang et al; "Development and Qualification of a Mechanical-Optical Interface for Parallel Optics Links" Society of Photo Optical Instrumentation Engineers, 2015. 8 Pgs.

International Search Report and Written Opinion PCT/US2016/029659 dated Jul. 11, 2016.

Childers, Darrell, et al. "Next-generation, high-density, low-cost, multimode optical backplane interconnect" SPIE OPTO. International Society for Optics and Photfonics, 2012, 11 pages.

Messbauer et al; "Design Considerations of the Expanded Beam LAMDEK Single-Mode Connector," Presented As FOC/LAN 85, Held in San Francisco, California, in 1985.

\* cited by examiner

Prior Art

FIG. 4A

Prior Art

FIG. 4B

Prior Art

EXPANDED-BEAM FERRULE WITH HIGH COUPLING EFFICIENCY FOR OPTICAL INTERFACE DEVICES

FIELD

The present disclosure relates to optical interface devices such as optical fiber connectors, and in particular to expanded-beam ferrules with high coupling efficiency for use in expanded-beam optical interface devices.

The entire disclosure of any publication or patent document mentioned herein is incorporated by reference, including US2012/0093461 (hereinafter, the '461 publication).

BACKGROUND

Optical fiber connectors are a type of optical interface device used for optically joining fiber optical cables where connect and disconnect capability is required. The traditional and most common type of optical fiber connector uses a ferrule to hold one or more optical fibers. The ferrule has a slightly curved end so that when two connectors are mated, the ends of the fibers come into physical contact. One drawback of physical-contact connectors is that they are sensitive to contamination. The size of airborne dust is known to range from submicrons to tens of microns, which is comparable to the core diameter of both single-mode fibers and multi-mode fibers. In addition, dirt and debris can fully truncate the optical path between the connected fibers. Consequently, data transmission between connectors that employ physical contact between the fibers can easily be degraded due to contamination on the surfaces. Another disadvantage of physical-contact connectors is that precise alignment is critical for obtaining high coupling efficiency. A small angular or lateral misalignment between the fiber ends can be detrimental to the coupling efficiency.

Another type of optical fiber connector uses microlenses at the respective fiber ends to provide the optical connection between fiber ends, thereby avoiding the need for physical contact between the fibers. Such connectors are referred to as expanded-beam (EB) connectors because the light beam from the launch optical fiber is expanded and collimated by the first microlens of the launch connector and then focused by the second microlens of the receive connector. While many of the problems of physical-contact connectors can be avoided through the use of expanded-beam connectors, there is still a need for improvements in misalignment tolerance and coupling efficiency.

SUMMARY

An aspect of the disclosure is an expanded-beam ferrule for an optical interface device that supports at least one optical fiber having a numerical aperture $NA_F$ and an end at an end portion. The expanded-beam ferrule includes: a ferrule body having opposite front and back ends, opposite top and bottom surfaces, and a central axis, wherein the front end includes a front surface, with the ferrule body being substantially transparent to light of wavelength $\lambda$; at least one fiber support feature configured to support the end of the at least one optical fiber at a terminal end wall of the ferrule body, the terminal end wall being spaced apart from the front surface by an intervening body portion having an axial thickness TH and a refractive index n, wherein the terminal end wall defines a planar first lens surface; at least one second lens surface defined in the front surface, with the first and second lens surfaces and the body portion of thickness TH residing therebetween defining at least one lens; and wherein the second lens surface is convex and aspheric with a conic constant C in the range from $-3.7/n^2 \leq C \leq -1.9/n^2$, and wherein the least one lens has an amount of on-axis spherical aberration SA in the range from $[(-150.0 \cdot NA_F^4) \cdot \lambda] \leq SA \leq [(-26.5 \cdot NA_F^4) \cdot \lambda]$.

Another aspect of the disclosure is an expanded-beam optical interface device for coupling light from at least one first optical fiber to at least one second optical fiber over an optical communication pathway. The expanded-beam optical interface device includes: first and second expanded-beam ferrules as described above and arranged with their respective front ends confronting so that their respective central axes are co-axial and the respective at least one second lens surfaces are generally axially aligned and axially spaced apart; and the first and second optical fibers operably arranged in and respectively supported by the at least one support feature of the first expanded-beam ferrule and by the at least one support feature of the second expanded-beam ferrule.

Another aspect of the disclosure is an expanded-beam optical interface device for coupling light of wavelength $\lambda$ over an optical communication pathway between first and second optical fibers having respective first and second ends and an optical fiber numerical aperture $NA_F$. The expanded-beam optical interface device includes: first and second confronting support members that are transparent to light of the wavelength $\lambda$ and that respectively include first and second ends that support respective first and second lenses that are axially aligned and spaced apart, wherein the first and second lenses have respective first and second front surfaces and first and second back surfaces, and wherein each of the first and second front lens surfaces is convex and aspheric with a conic constant C in the range from $-3.7/n^2 \leq C \leq -1.9/n^2$ where n is the refractive index of the material of the at least one lens, and wherein each of the first and second lenses has an amount of on-axis spherical aberration SA in the range from $[(-150.0 \cdot NA_F^4) \cdot \lambda] \leq SA \leq [(-26.5 \cdot NA_F^4) \cdot \lambda]$; and the first and second optical fibers respectively operably supported by the first and second support members such that the first and second optical fiber ends are disposed adjacent the first and second back lens surfaces.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute a part of this detailed description.

Cartesian coordinates are shown in some of the Figures for the sake of reference and are not intended to be limiting as to direction or orientation.

In the discussion below, light 110 is assumed to travel from left to right in the Figures unless otherwise noted, so that the launch optical fiber and launch EB ferrule is on the left side of the Figure and the receive optical fiber and receive EB ferrule is on the right side of the Figure.

It is also assumed in the discussion below that the numerical aperture of light 110 emitted from optical fiber 50 is equal to or substantially the same as the fiber numerical aperture.

Example EB Ferrule

Figure 1A:
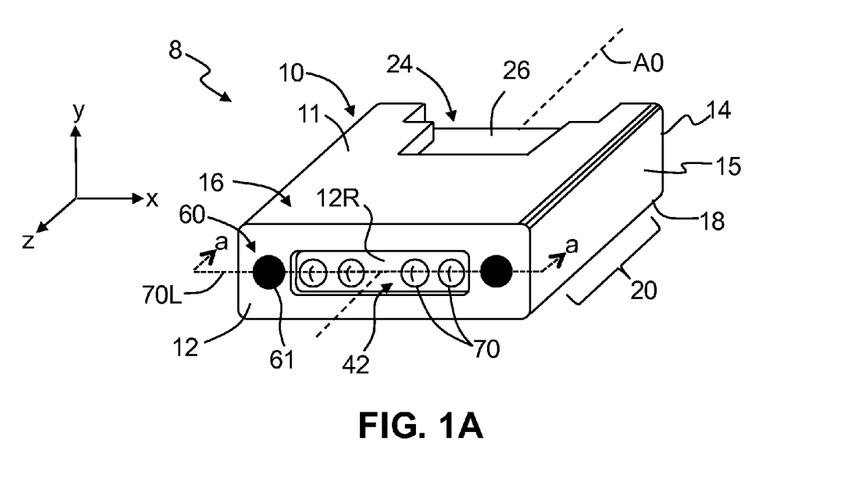
FIG. 1A is a front-elevated view of an example optical fiber support member in the form of a multi-fiber optical ferrule ("EB ferrule") for use in an EB optical interface device.
Figure 1B:
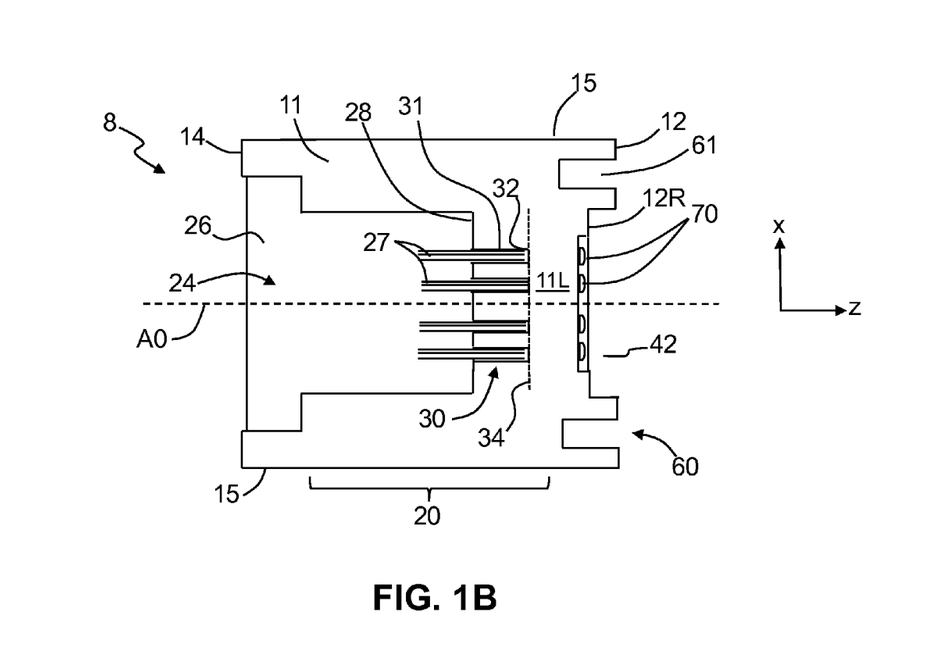
FIGS. 1B and 1C are cross-sectional views of the EB ferrule of FIG. 1A as taken along the line a-a in the x-z plane.
Figure 1C:
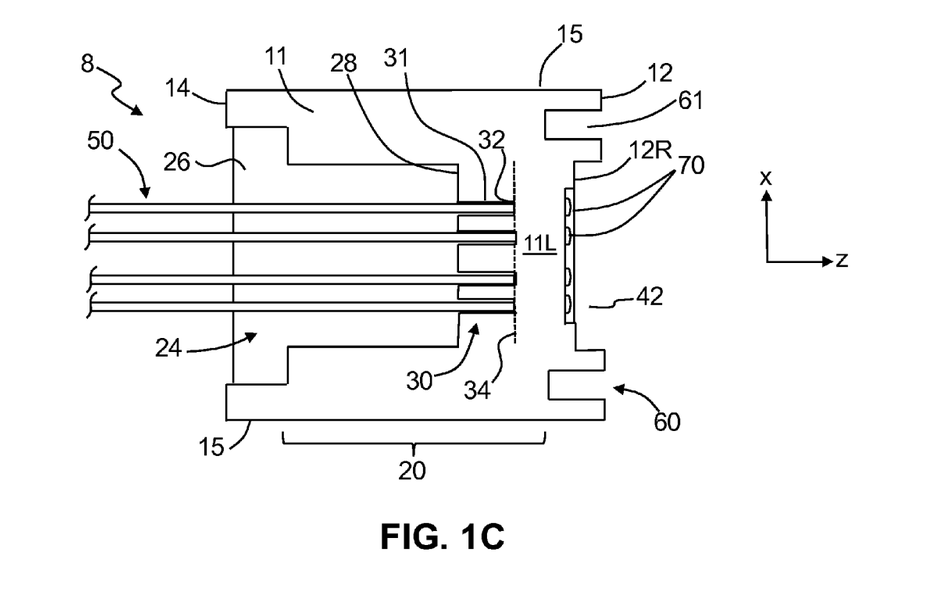
Figure 1D:
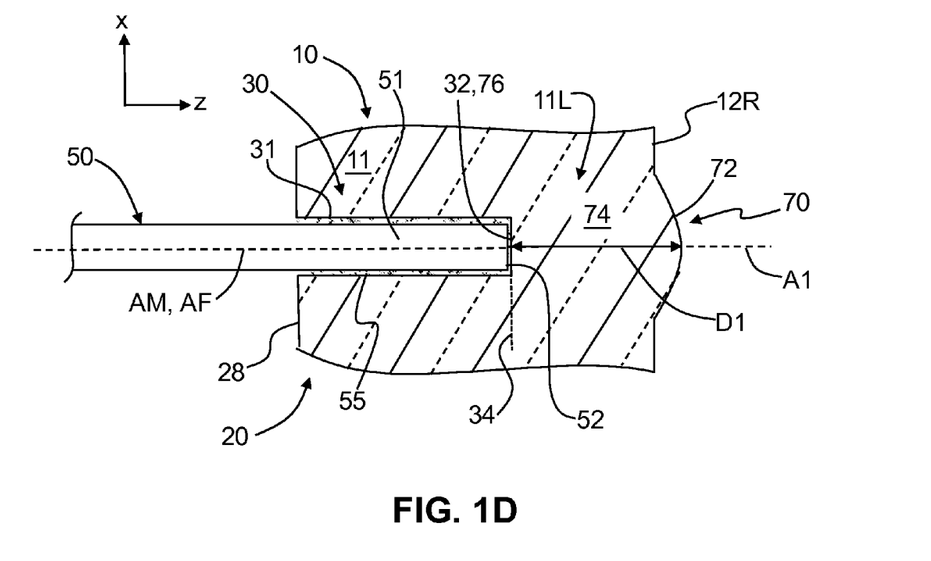
FIG. 1D is a close-up, top-down cross-sectional view of a middle portion of the EB ferrule of FIG. 1C.
Figure 1E:
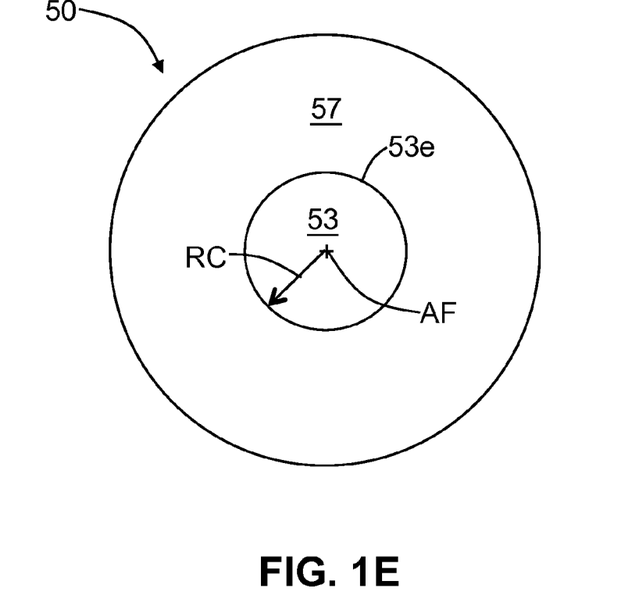
FIG. 1E is a cross-sectional view of an optical fiber showing the core and the cladding, as well as the core edge and the optical fiber central axis.
Figure 2:
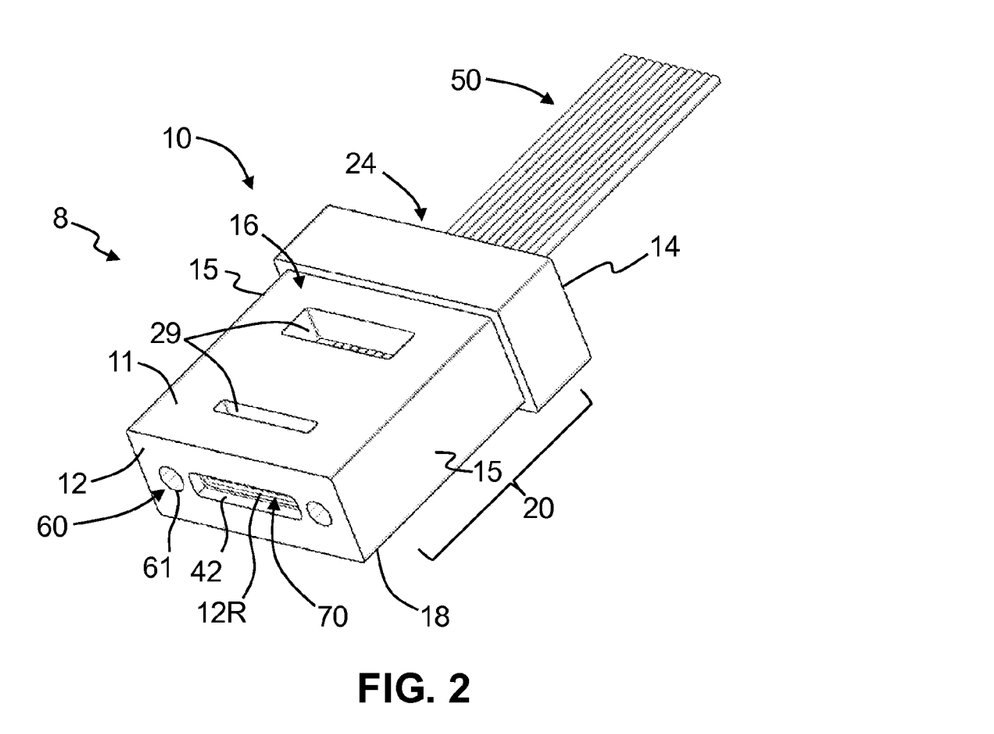
FIG. 2 is a front-elevated view of an example EB ferrule similar to that shown in FIG. 1A and that is based on the EB ferrule of the '461 publication.

FIG. 1A is a front-elevated view of an example optical fiber support member 8 in the form of a multi-fiber optical ferrule ("EB ferrule") 10 for use in an optical interface device such as an EB connector. In the discussion below, support member 8 is discussed with reference to EB ferrule 10 by way of example and for ease of discussion. FIGS. 1B and 1C are cross-sectional views of EB ferrule 10 as taken along the line a-a in the x-z plane. FIG. 1D is a close-up, top-down cross-sectional view of a middle portion of EB ferrule 10 as seen in FIG. 1C. FIG. 1E is a cross-sectional view of an example optical fiber. FIG. 2 is a front-elevated view of an example EB ferrule 10 similar to that shown in FIG. 1A and is based on the EB ferrule of the '461 publication. Reference is now made to the above-mentioned Figures in describing the example EB ferrule 10.

The EB ferrule 10 has a body 11 with a front end 12, a back end 14, substantially parallel opposite sides 15, substantially parallel top and bottom surfaces 16 and 18, and a middle portion 20 between the front and back ends. The ferrule body 11 has a central axis A0 that runs parallel to sides 15 in the middle of the ferrule body. In an example, EB ferrule 10 has a unitary construction, i.e., body 11 is made as a single integral element that in an example is formed by a molding process using a single homogeneous material. In an example, EB ferrule 10 is made of a material that is transparent to light having a wavelength λ such as is used in optical communication systems, e.g., 880 nm or 1310 nm or 1550 nm. An example material for EB ferrule 10 is an optically clear material, such as a polyetherimide (e.g., Ultem), polycarbonate, cyclic olefin copolymer, cyclic olefin polymer or other transparent polymers.

The EB ferrule 10 optionally includes a recess 24 formed in top surface 16 adjacent back end 14 that accommodates the insertion of one or more optical fibers 50 into the EB ferrule (see FIG. 1C). The recess 24 defines a support surface 26 and an interior wall 28 within body 11 within middle portion 20. The EB ferrule 10 may also have other recesses or openings 29 (see FIG. 2) in top surface 16 used to inject epoxy to secure optical fibers 50 within EB ferrule 10.

The EB ferrule 10 includes at least one optical fiber support feature ("fiber support feature") 30 that operably supports optical fiber 50 within ferrule body 11. In the example embodiment, the at least one fiber support feature 30 includes at least one micro-hole 31. Each micro-hole 31 extends in the z-direction (i.e., generally parallel to central axis A0) from interior wall 28 toward front end 12 to a fiber-stop plane 34 in middle portion 20. In an example where there is no recess 24, micro-holes 31 extend from back end 14 to fiber-stop plane 34. Each micro-hole 31 has a central axis AM and a terminal end 32 at fiber-stop plane 34. The terminal end 32 is a wall, and so is referred to hereinafter as "terminal end wall" 32. In an example, terminal end wall 32 has a planar surface that resides in the x-y plane (i.e., orthogonal to the ferrule central axis A0).

Each micro-hole 31 is sized to accommodate an end portion 51 of optical fiber 50, with the end portion having an end 52 that resides adjacent the corresponding terminal end wall 32 of the micro-hole in which the optical fiber resides. As noted above, epoxy 55 can be used to secure end portions 51 of optical fibers 50 within micro-holes 31, as shown in FIG. 1D. In an example, epoxy 55 is may be index matched and light curable. In this regard, epoxy 55 can be considered as constituting an additional support feature 30.

In an example, the at least one support feature 30 can additionally include one or more guide features 27 (e.g., grooves such as v-grooves or u-grooves) formed in support surface 26. The guide features 27 are configured to guide optical fibers 50 into micro-holes 31 and support the optical fibers as optical fiber end portions 51 enter and then reside in the respective micro-holes. The EB ferrule 10 can be figured for use with one or more optical fibers 50, and the example EB ferrule shown and described herein supports multiple optical fibers by way of example.

FIG. 1E is a cross-sectional view of an example optical fiber 50 showing a core 53 and a surrounding cladding 57, and also showing a core edge 53e. The optical fiber 50 has a central axis AF and a fiber numerical aperture $NA_F$. The core 53 has a radius RC, which in an example can be 25 µm, 31.25 µm or 40 µm, which represent three standard core sizes for multimode optical fibers.

In an example, EB ferrule 10 has a recessed portion 42 in front end 12 that defines a recessed front surface 12R. The recessed front surface 12R and the portion of ferrule body 11 adjacent thereto supports a plurality of lenses 70 arranged in a line 70L that runs in the x-direction. Each lens 70 has a front lens surface 72 and a lens body 74 defined by a lens portion 11L of the portion of ferrule body 11 that resides between the lens front surface and terminal end wall 32 of micro-hole 31. The terminal end wall 32 thus defines a rear lens surface 76 of lens 70. The recessed portion 42 allows for front lens surfaces 72 to be set back from ferrule front end 12. In an example, front lens surfaces 72 are convex. Each lens 70 has a central axis A1 that is aligned with axis AM of a corresponding micro-hole 31. Each optical fiber 50 has a central fiber axis AF that is substantially coaxial with central axis AM of micro-hole 31 in which it resides.

In an example, the number of lenses 70 corresponds to the number of micro-holes 31 and the number of optical fibers 50 that EB ferrule 10 is configured to support, each lens being axially aligned with a corresponding micro-hole. In an example, lenses 70 are molded with the rest of EB ferrule 10 and are generally collimating-type lenses. That is, lenses 70, because they are in contact with air in recessed portion 42, can be made collimating due to the difference in the index of refraction between body 11 and the air, as well as the shape of lens surfaces 72. The lenses 70 and in particular the shape of lens surfaces 72 are discussed in greater detail below. In other examples, lenses 70 can be configured as focusing lenses.

The EB ferrule 10 also can include one or more alignment features 60, such as guide-pin openings 61 that accommodate a guide pin 62 (see FIG. 3A) to promote alignment between two interfacing EB ferrules. It should be noted that while the position and apparent size of guide-pin openings 61 are standard for the industry, the size, location and/or pitch of the guide-pin openings may be altered to prevent EB ferrule 10 from being mated to a standard ferrule, such as an MT ferrule. Other types of alignment features 60 can also be used.

The alignment features 60 can provide general alignment of mated EB ferrules 10 but typically cannot prevent small amounts of misalignment (e.g., lateral and angular) from occurring, and such small misalignments can have a relatively large impact on coupling loss. As discussed below, one of the benefits of EB ferrule 10 disclosed herein is its tolerance for misalignments even when alignment features 60 are used to establish the general (or "coarse") alignment between interfaced EB ferrules.

FIG. 1C shows optical fibers 50 operably arranged within EB ferrule 10, with FIG. 1D being a close-up view of one of the optical fibers and the corresponding lens 70. An example process for inserting optical fibers 50 into EB ferrule 10 is as follows. First, end portions 51 of optical fibers 50 are stripped bare and then cleaned. The ends 52 at end portions 51 of optical fibers 50 are then cleaved and inserted into EB ferrule 10 via recess 24 and inserted into respective micro-holes 31. The end portions 51 of optical fibers 50 are pushed through micro-holes 31 until their respective ends 52 reach terminal end wall 32 of the micro-hole at fiber-stop plane 34. An index-matched epoxy 55 can be inserted into micro-holes 31 via openings 29 in top surface 16 as shown in the example EB ferrule 10 of FIG. 2) to secure end portions 51 of optical fibers 50 in their respective micro-holes. The epoxy 55 can then be cured, e.g., light cured using UV and near-UV light.

EB Optical Interface Device

Figure 3A:
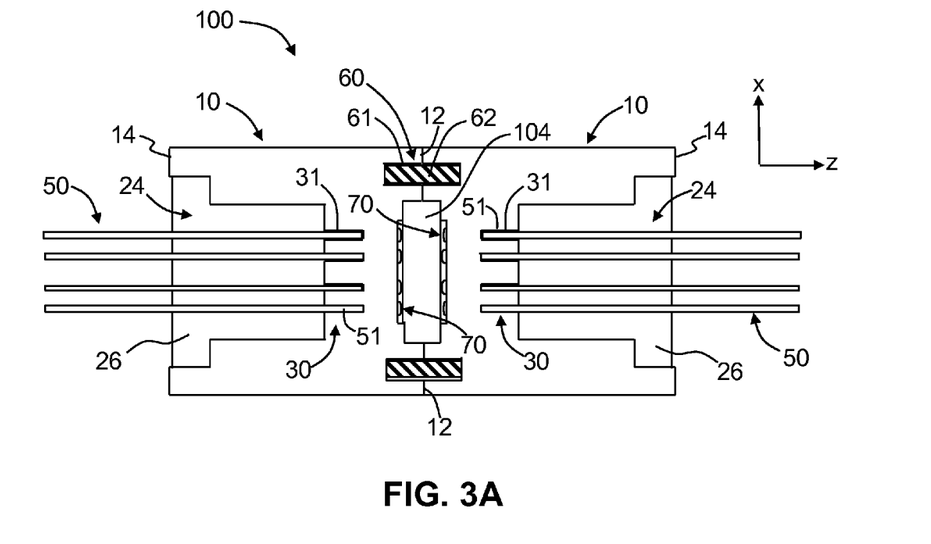
FIG. 3A is a top-down (i.e., x-z plane) cross-sectional view of two interfaced EB ferrules that form an EB optical interface device.
Figure 3B:
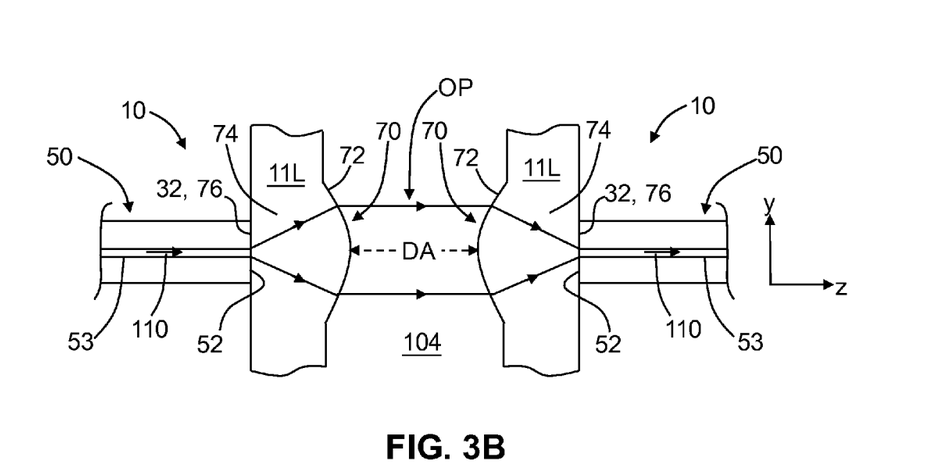
FIG. 3B is close-up cross-sectional (i.e., y-z plane) view of the two opposing lenses of the optical interface device of FIG. 3A.

FIG. 3A is a top-down (i.e., x-z plane) cross-sectional view of two confronting EB ferrules 10, while FIG. 3B is close-up cross-sectional (i.e., y-z plane) view of the two opposing lens surfaces 72 of the two confronting EB ferrules of FIG. 3A. The two confronting EB ferrules 10 are formed by the interfacing of the two EB ferrules at their respective front ends 12 and define an EB optical interface device 100. The two confronting (interfaced) EB ferrules 10 define a chamber 104 formed by the respective recessed portions 42 of the EB ferrules, with front lens surfaces 72 of opposing lenses 70 separated by an axial distance DA across the chamber in the z-direction. In an example, 0.2 mm≤DA≤2.2 mm.

In an example, chamber 104 is filled with air and is substantially sealed off from the environment outside of the two confronting EB ferrules 10. This serves to prevent dust, oil, moisture or other contaminants from being deposited on lens surfaces 72 and/or suspended within chamber 104 and adversely affecting the optical communication between the two lenses 70.

With reference to FIG. 3B, in the general operation of EB optical interface device 100, light 110 traveling mainly within core 53 of the launch optical fiber 50 on the left-hand side of the EB optical interface device exits optical fiber end 52 at rear lens surface 76 of lens 70. The light 110 diverges as it leaves the launch optical fiber 50 and continues to diverge as it passes through lens body 74 to front lens surface 72. The light 110 then exits front lens surface 72 and refracts thereat to form substantially collimated light. The substantially collimated light 110 then travels across chamber 104 over to lens surface 72 of the receive lens 70 on the right-hand side (receive side) of EB optical interface device 100. The substantially collimated light 110 is then focused onto end 52 of the receive optical fiber 50 by lens surface 72, and in particular is focused onto core 53 and optical fiber end 52. The path that light 110 takes from the launch optical fiber 50 to the receive optical fiber defines an optical communication pathway OP of EB optical interface device 100.

The conventional wisdom with lens-based EB ferrules 10 is to design lenses 70 so that the best focus occurs on axis, i.e., on central axis A1. This can be accomplished for example by minimizing the on-axis spherical aberration using aspheric lenses with a "conic constant" equal to $-1/n^2$ where n is the refractive index of the lens, for example as disclosed in the publication J. P. Carrol, F. B. Messbauer, and C. H. Whitefield, "Design Considerations of the Expanded Beam Lamdek Single-Mode Connector," presented at FOC/LAN 85, held in San Francisco, Calif., in 1985.

Figure 4A:
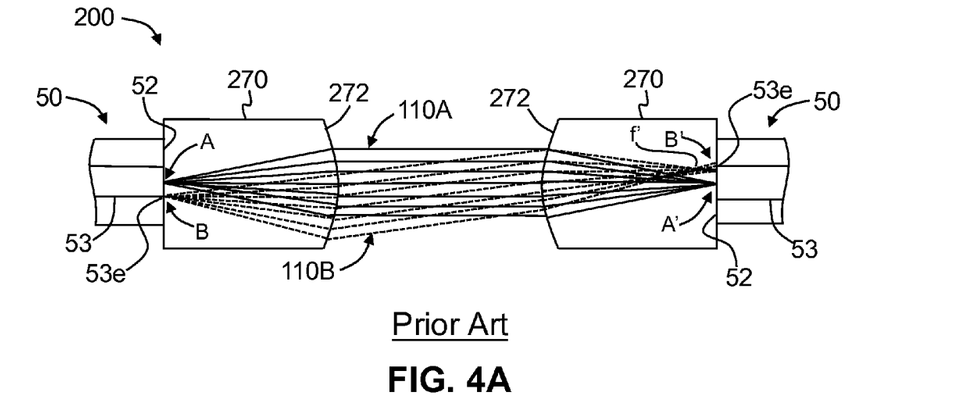
FIG. 4A is a schematic optical diagram of a conventional optical interface device that includes two opposing (interfaced) prior art EB ferrules that have conventionally designed lenses.

FIG. 4A is a schematic optical diagram of a conventional optical interface device 200 that includes two opposing prior art EB ferrules 210 that have conventionally designed lenses 270. The light 110 is shown as on-axis light rays 110A (solid lines) and off-axis light rays 110B (dashed lines). The on-axis location at the launch optical fiber 50 and core 53 at optical fiber end 52 is denoted A and the off-axis location at the edge 53e of core 53 is denoted B. The conjugate locations at the receive optical fiber 50 are denoted A' and B', respectively.

Figure 4B:
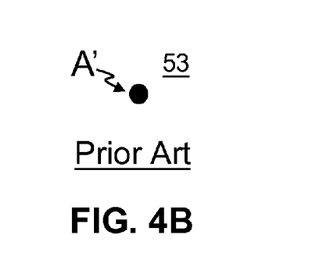
FIG. 4B is the on-axis spot diagram at the center of the core of the receive optical fiber for light rays traveling over the optical communication pathway of the optical interface device of FIG. 4A, wherein the on-axis spot diagram shows substantially stigmatic imaging and a high degree of correction.

FIG. 4B is a spot diagram of on-axis light rays 110A that diverge from the launch optical fiber 50 on the left-hand side of FIG. 4A at on-axis location A and that converge at on-axis location A' at core 53 of the receive optical fiber 50. The on-axis spot diagram shows excellent on-axis focus representing a high degree of convergence of on-axis light rays 110A. This tight on-axis focus is representative of substantially stigmatic imaging.

Figure 4C:
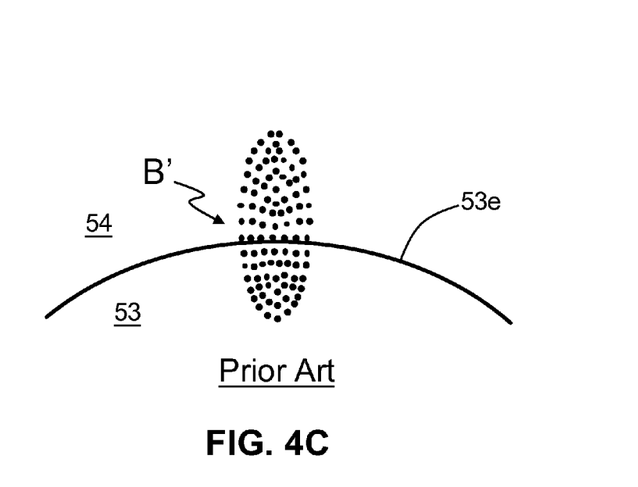
FIG. 4C is the off-axis spot diagram at the edge of the optical fiber core of the receive optical fiber for light rays traveling over the optical communication pathway of the optical interface device of FIG. 4A, wherein the off-axis spot diagram shows that a substantial portion of the off-axis light misses the fiber core and contributes substantially to coupling loss.

FIG. 4C is a spot diagram of off-axis light rays 110B that diverge from the launch optical fiber 50 at location B at edge 53e of core 53 and that converge at off-axis location B' at edge 53e of core 53 of the receive optical fiber 50. The off-axis spot diagram shows a relatively large amount of dispersion or spread in the rays, with a relatively large portion of the off-axis spots (more than half) falling outside of core 53. This is caused by off-axis light rays 110B coming to a focus f' in front of optical fiber end 52 at core edge 53e rather than at the optical fiber end. As a consequence, a relatively large amount of light 110 is not coupled into the core 53 of receive optical fiber 50 at core edge 53e. This results in a reduction in coupling efficiency even though the on-axis focus performance is excellent.

Misalignment: Lateral Offset and Angular Offset

Figure 5A:
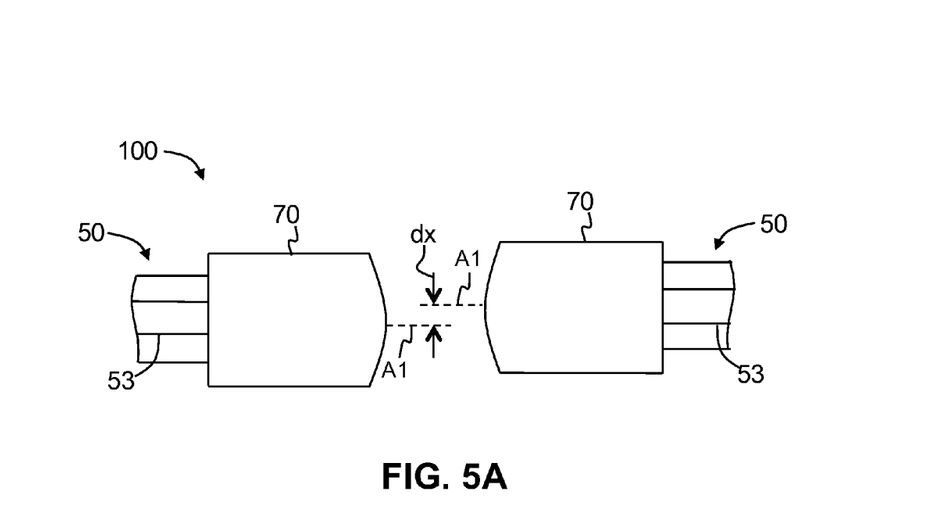
FIGS. 5A and 5B are schematic diagrams of example optical fibers and lenses of an example optical interface device and illustrate a lateral offset misalignment (FIG. 5A) and an angular tilt misalignment (FIG. 5B)
Figure 5B:
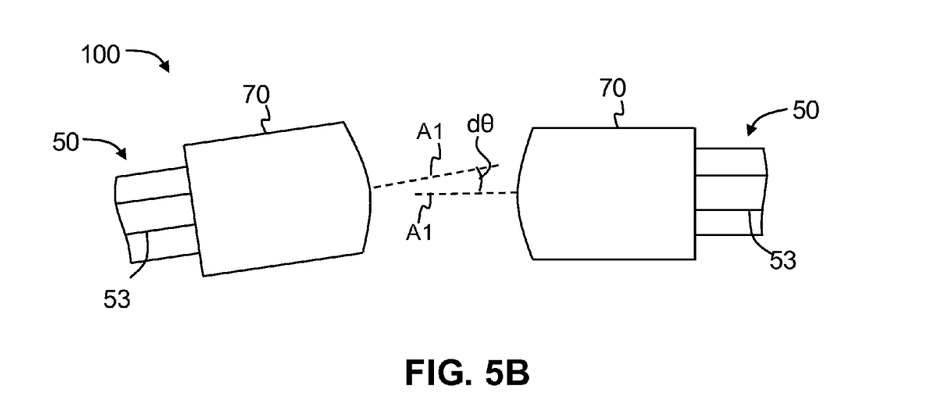

An issue with lens-based EB ferrules is that they can be sensitive to misalignments when used in an optical interface device. The misalignments can be in the form of a lateral offset and/or an angular offset. FIGS. 5A and 5B are similar to FIG. 4A and respectively illustrate the lateral offset dx and the angular offset dθ between the launch and receive EB ferrules 10 of EB optical interface device 100. These offsets are also discussed below in connection with the performance of EB ferrules 10 and optical interface device 100 as disclosed herein as compared to prior art EB ferrules and assemblies.

Lens Parameters and Optical Design

Figure 6:
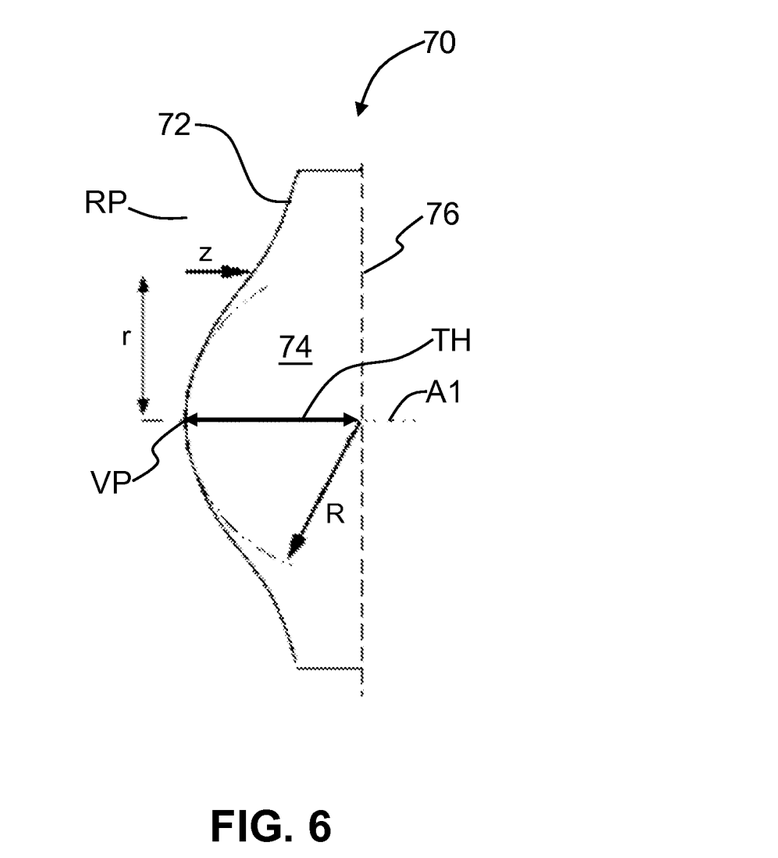
FIG. 6 is a schematic cross-sectional diagram of an example lens used in the EB ferrule disclosed herein and illustrates example parameters used to characterize the lens.

FIG. 6 is a schematic cross-sectional diagram of an example lens 70 illustrating example parameters used to characterize the lens. The parameters include the lens radius R, the height r on a point on the lens surface as measured from central axis A1, the axial lens thickness TH, and the surface curvature z(r) as measured from a reference plane RP. The reference plane RP is defined by a plane that passes through an on-axis vertex point VP of lens surface 72 and that is orthogonal to central axis A1.

In an example, lens surface 72 is aspheric and is defined by the equation $$z(r)=r^2/\{R[1+((1-(1+C)r^2/R^2)^{1/2}]\}$$

where central axis A1 runs in the z-direction. The surface shape z(r) is also called the "sag." The radius of curvature R is measured at the vertex point VP (where r=0). The parameter C is called the "conic constant," and is a measure of how lens surface 72 deviates from a perfect spherical shape. When the conic constant C=0, lens surface 72 is spherical and is described by the radius R for all values of r.

In an example embodiment, lens surface 72 is convex and aspherical, with a conic constant C in the range $-3.7/n^2 \le C \le -1.9/n^2$.

Each lens 70 of EB ferrule 10 is designed to have a high coupling efficiency CE (i.e., low coupling loss CL) when used in EB optical interface device 100. The coupling loss CL is defined herein as the ratio (difference in decibels dB) between the optical power in the input fiber and the optical power couple into the output fiber, net of any losses arising from Fresnel reflection at the interfaces. In practice such coupling loss is approximately achieved by using anti-reflection coatings on the lens surfaces, as is known in the art. In particular, lens 70 is configured such that more light 110 is coupled into optical fiber core 53 at the edge of the core at location B' as compared to the prior art, albeit at the expense of the high-quality (i.e., substantially stigmatic) imaging for on-axis location A'. This approach is based in part on the fact that a gradient-index optical fiber 50 with a parabolic refractive index profile has a radially non-uniform numerical aperture $NA_F$. Thus, the fiber numerical aperture $NA_F$ is smaller at core edge 53e of the optical fiber than in the center (i.e., on axis). The smaller fiber numerical aperture $NA_F$ at core edge 53e makes it more difficult to capture light as compared to the on-axis location, which has a larger value for $NA_F$.

Figure 7A:
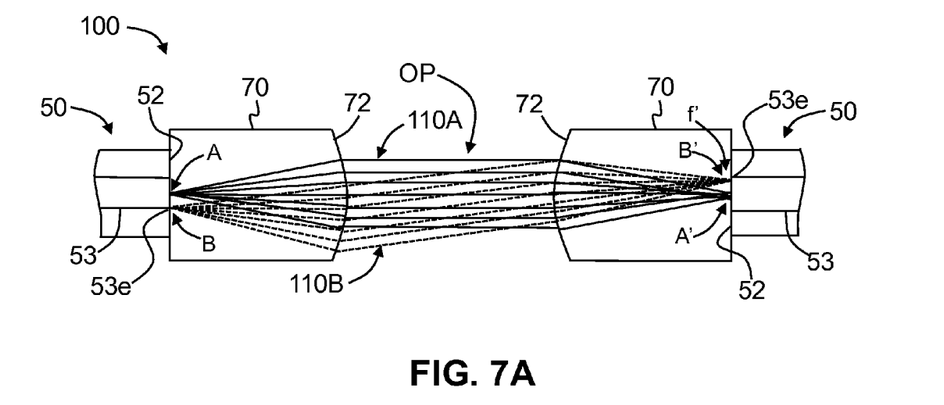
FIG. 7A is a schematic optical diagram of an optical interface device according to the disclosure that includes two opposing (interfaced) prior art EB ferrules that have lenses disclosed herein.
Figure 7B:
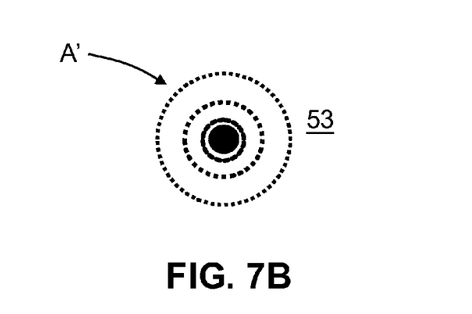
FIG. 7B is the on-axis spot diagram at the center of the core of the receive optical fiber for light rays traveling over the optical communication path of the optical interface device of FIG. 4A, wherein the on-axis spot diagram shows a substantial amount of divergence in the light rays due to a substantial amount of spherical aberration.
Figure 7C:
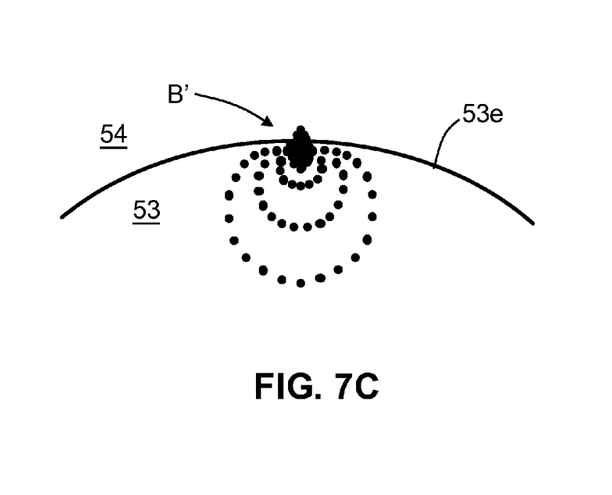
FIG. 7C is the off-axis spot diagram at the edge of the optical fiber core of the receive optical fiber for light rays traveling over the optical communication path of the optical interface device of FIG. 4A, wherein the off-axis spot diagram shows that substantially all of the off-axis light is coupled into the optical fiber core, thereby contributing to a high coupling efficiency (i.e., a reduced coupling loss as compared to that of a conventional optical interface device; see FIG. 4C)

In view of the above, lens 70 as disclosed herein is configured so that most of off-axis light rays 110B at and near edge 53e of core 53 focuses on and not in front of optical fiber end 52 to ensure that as much of the optical power as possible in off-axis light rays 110B enters the core. This is illustrated in FIGS. 7A through 7C, which are similar to FIGS. 4A through 4C. In FIG. 7A, it can be seen that the focus f' is substantially at end 52 of the receive optical fiber 50 at off-axis location B'. FIG. 7B shows the spot diagram for on-axis point A', and this spot diagram shows that on-axis light rays 110A are no longer well focused on axis, i.e., the on-axis imaging is no longer substantially stigmatic and in fact has substantial aberration (in particular spherical aberration, as discussed below). Thus, the on-axis focus spot is substantially larger than for the prior art case shown in FIG. 4B. On the other hand, FIG. 7C is the spot diagram for off-axis location B', and this spot diagram shows that most of the off-axis light rays 110B fall within core 53. This off-axis light-collection performance leads to higher coupling efficiency (i.e., reduced coupling loss CL) as compared to prior art lenses used in conventional EB ferrules.

In an example, the surface radius of curvature R is chosen so that the incident angle of light 110 does not exceed the NA of optical fiber 50. The thickness TH of lens 70, which is equivalent to the focal length of convex lens surface 72 under a paraxial condition, is roughly associated with the radius R, the refractive index n of the material that makes up body 11 of EB ferrule 10, and the refractive index $n_{air}$ of air via the relationship $$TH=[n/(n-n_{air})]\cdot R$$

In an example, the lens thickness TH is in the range 0.4 mm≤TH≤1.3. Also in an example, lens 70 has a lens numerical aperture $NA_L$ in the range 0.2≤TH≤0.35.

Lens Performance

The performance of lens 70 disclosed herein was compared with an example lens 272, which is designed based on known art, namely it has a conic constant approximately equal to the value that minimizes the spherical aberration, such value being equal to $-1/n^2$. Both lens 70 and lens 272 had a radius R=199 μm, a thickness TH=520 μm, a refractive index n=1.627 and a clear aperture (diameter)=0.24 mm. The performance was evaluated based on an optical fiber having a core radius RC=25 μm and a fiber numerical aperture $NA_F$ of 0.2, with the actual outputted light 110 having an NA of 0.158. The performance was compared based on respective ferrule assemblies 100 and 200, each having an axial spacing DA=620 μm. The difference in the lenses 70 and 272 was the conic constant C, which for lens 70 was −0.8, while for lens 272 it was −0.38.

Lens and EB Optical Interface Device Performance

Figure 8A:
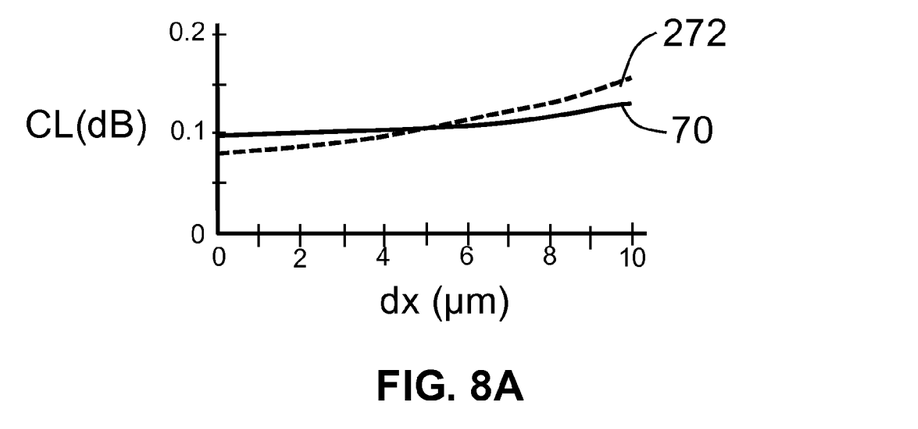
FIG. 8A is a plot of the coupling loss CL (dB) versus the lateral displacement dx (μm) (see FIG. 5A) for an optical interface device that uses the lenses as disclosed herein (solid line curve) as compared to a prior art optical interface device (dashed line curve)

FIG. 8A is a plot of the coupling loss CL (dB) versus the lateral displacement dx (μm) for EB optical interface device 100 (solid line curve) as compared to the prior art optical EB interface device 200 (dashed line curve) as set forth above. The coupling loss CL is only slightly higher for lens 70 for lateral displacements of less than 5 μm, with the coupling loss becoming equal for the two lenses at a lateral displacement of about 5 μm. For lateral displacements dx in increasing amounts beyond 5 μm, the coupling loss CL is greater for the prior art lens 272 and the difference in coupling loss grows.

Figure 8B:
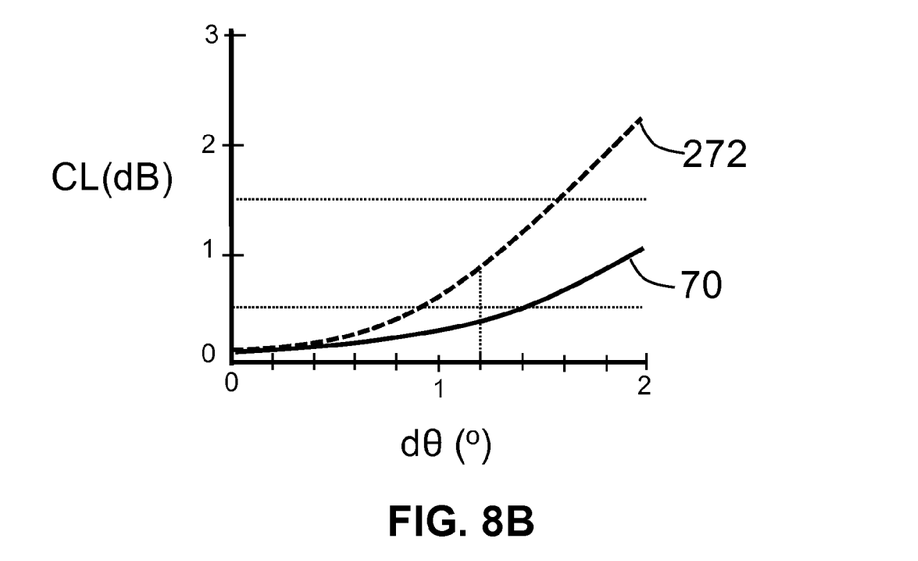
FIG. 8B is a plot of the coupling loss CL (dB) versus the angular displacement dθ (degrees) (see FIG. 5B) for an optical interface device that uses the lenses as disclosed herein (solid line curve) as compared to a prior art optical interface device (dashed line curve)

FIG. 8B is a plot of the coupling loss CL (dB) versus the angular displacement de (degrees) (see FIG. 5B) for lens 70 as disclosed herein and used in EB optical interface device 100 (solid line curve) as compared to prior art lens 272 used in prior art EB optical interface device 200 (dashed line curve). The plot of FIG. 8B shows lower coupling loss CL (and thus a higher coupling efficiency CE) for the range of angular displacement shown, with an angular displacement of 2° showing a difference of about 1 dB, which represents a difference in coupled optical power of about 21%.

Figure 9A:
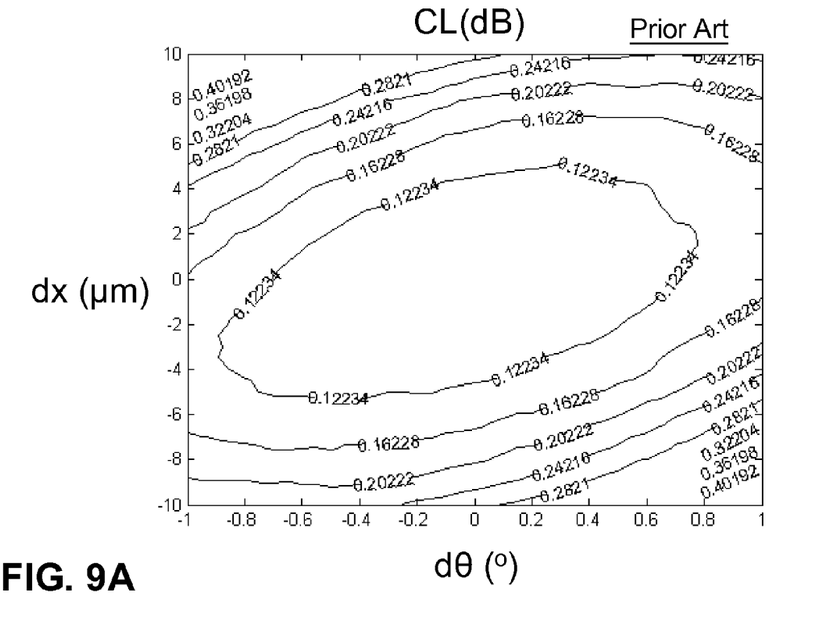
FIGS. 9A and 9B are contour plots of the coupling loss CL (db) as a function of lateral offset dx (μm) and angular offset dθ (degrees) for an example prior art optical interface device that uses two prior art lenses (FIG. 9A) and an example optical interface device that uses lenses as disclosed herein (FIG. 9B).
Figure 9B:
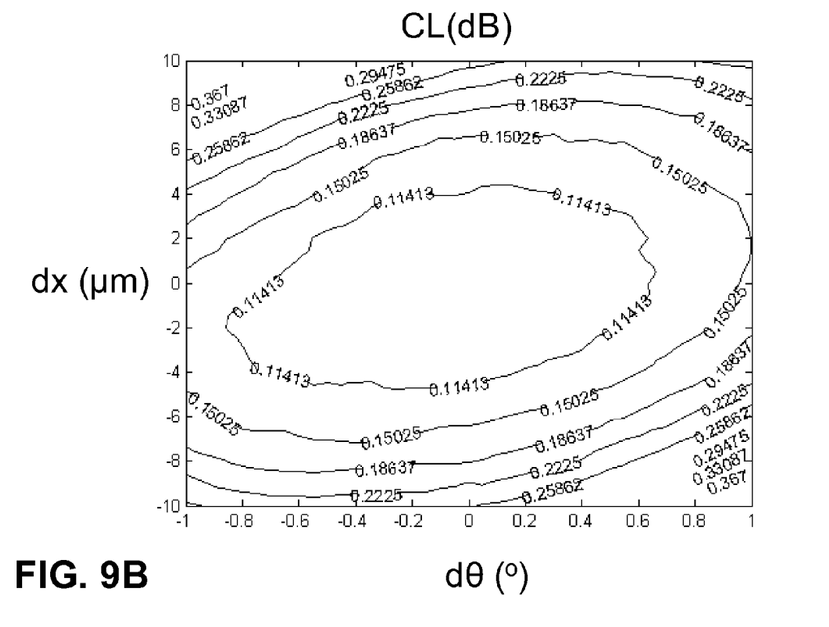

FIGS. 9A and 9B are contour plots of the coupling loss CL (db) as a function of lateral offset dx (μm) and angular offset dθ (degrees) for prior art EB optical interface device 200 that uses two lenses 272 (FIG. 9A) and for the EB optical interface device 100 disclosed herein that uses two lenses 70. The plots have the same general shape, except that the coupling loss CL is generally lower for EB optical interface device 100 than for EB optical interface device 200. The difference in coupling loss CL for lenses 70 as compared to lens 272 becomes greater for higher amounts of angular offset and lateral displacement, e.g., by about 10% at angular offsets of about 1 degree and for lateral offsets of about 5 μm. This illustrates a higher tolerance for misalignment of optical interface device 100, and this higher tolerance is directly attributed to the configuration (design) of lenses 70.

In an example, the coupling loss CL<0.5 dB for an angular misalignment of 1.2°, while in another example, CL<1.5 dB for an angular misalignment of 2°.

It will be apparent to those skilled in the art that various modifications to the embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An expanded-beam ferrule for an optical interface device that supports at least one optical fiber having a numerical aperture $NA_F$ and an end at an end portion, comprising:
    a ferrule body having opposite front and back ends, opposite top and bottom surfaces, and a central axis, wherein the front end includes a front surface, with the ferrule body being substantially transparent to light of wavelength λ;
    at least one fiber support feature configured to support the end of the at least one optical fiber at a terminal end wall of the ferrule body, the terminal end wall being spaced apart from the front surface by an intervening body portion having an axial thickness TH and a refractive index n, wherein the terminal end wall defines a planar first lens surface;
    at least one second lens surface defined in the front surface, with the first and second lens surfaces and the body portion of thickness TH residing therebetween defining at least one lens; and
    wherein the second lens surface is convex and aspheric with a conic constant C in the range from $-3.7/n^2 \leq C \leq -1.9/n^2$, and wherein the least one lens has an amount of on-axis spherical aberration SA in the range from $[(-150.0 \cdot NA_F^4) \cdot \lambda] \leq SA \leq [(-26.5 \cdot NA_F^4) \cdot \lambda]$.

2. The expanded-beam ferrule according to claim 1, wherein the at least one fiber support feature includes at least one micro-hole sized to accommodate the end portion of the optical fiber, the at least one micro-hole running generally parallel to the central axis from either the back end or an interior wall spaced apart from the front surface, the micro-hole terminating at the terminal end wall and being axially aligned with the at least one second lens surface.

3. The expanded-beam ferrule according to claim 1, wherein the at least one lens has a thickness TH in the range from 0.4 mm≤TH≤1.3 mm and a numerical aperture NA in the range from 0.2≤NA≤0.35.

4. The expanded-beam ferrule according to claim 1, wherein the amount of spherical aberration SA is in the range from $[(-150.0 \cdot NA_F^4) \cdot \lambda] \leq SA \leq [(-48.0 \cdot NA_F^4) \cdot \lambda]$.

5. The expanded-beam ferrule according to claim 1, wherein the ferrule body is a unitary structure made of a single homogenous material.

6. The expanded-beam ferrule according to claim 1, wherein the ferrule body includes a recessed portion at the front end so that the front surface is recessed from the front end, and wherein the second lens surface is recessed relative to the front end.

7. The expanded-beam ferrule according to claim 1, wherein the at least one lens comprises a plurality of lenses.

8. The expanded-beam ferrule according to claim 1, wherein the at least one lens has a focal length substantially the same as the axial thickness TH.

9. An expanded-beam optical interface device for coupling light from at least one first optical fiber to at least one second optical fiber over an optical communication pathway, comprising:
    first and second expanded-beam ferrules according to claim 1 arranged with their respective front ends confronting so that their respective central axes are co-axial and the respective at least one second lens surfaces are generally axially aligned and axially spaced apart; and
    the first and second optical fibers operably arranged in and respectively supported by the at least one support feature of the first expanded-beam ferrule and by the at least one support feature of the second expanded-beam ferrule.

10. The expanded-beam optical interface device according to claim 9, wherein the respective second surfaces are axially spaced apart by a distance DA in the range from 0.2 mm≤DA≤52.2 mm.

11. The expanded-beam optical interface device according to claim 9, wherein the light coupling has a coupling loss CL<0.5 dB for an angular misalignment between the first and second expanded-beam ferrules of 1.2°.

12. The expanded-beam optical interface device according to claim 9, wherein the light coupling has a coupling loss CL<1.5 dB for an angular misalignment between the first and second expanded-beam ferrules of 2°.

13. The expanded-beam optical interface device according to claim 9, wherein the first and second optical fibers are multimode optical fibers.

14. The expanded-beam optical interface device according to claim 9, wherein the first and second at least one lenses of the first and second expanded-beam ferrules each include multiple first and second lenses.

15. An expanded-beam optical interface device for coupling light of wavelength λ over an optical communication pathway between first and second optical fibers having respective first and second ends and an optical fiber numerical aperture $NA_F$, comprising:
    first and second confronting support members that are transparent to light of the wavelength λ and that respectively include first and second ends that support respective first and second lenses that are axially aligned and spaced apart, wherein the first and second lenses have respective first and second front surfaces and first and second back surfaces, and wherein each of the first and second front lens surfaces is convex and aspheric with a conic constant C in the range from $-3.7/n^2 \leq C \leq -1.9/n^2$ where n is the refractive index of the material of the at least one lens, and wherein each of the first and second lenses has an amount of on-axis spherical aberration SA in the range from $[(-150.0 \cdot NA_F^4) \cdot \lambda] \leq SA \leq [(-26.5 \cdot NA_F^4) \cdot \lambda]$; and
    the first and second optical fibers respectively operably supported by the first and second support members such that the first and second optical fiber ends are disposed adjacent the first and second back lens surfaces.

16. The expanded-beam optical interface device according to claim 15, wherein each of the first and second support members comprises an expanded-beam ferrule having a ferrule body, and wherein the first and second optical fibers are respectively supported by first and second micro-holes formed in the respective ferrule bodies.

17. The expanded-beam optical interface device according to claim 16, having a coupling loss CL<0.5 dB for an angular misalignment of 1.2° between the first and second support members.

18. The expanded-beam optical interface device according to claim 17, wherein the light coupling has a coupling loss CL<1.5 dB for an angular misalignment of 2° between the first and second support members.

19. The expanded-beam optical interface device according to claim 15, wherein the first and second front surfaces are axially spaced apart by a distance DA in the range from 0.2 mm≤DA≤2.2 mm.

20. The expanded-beam ferrule according to claim 15, wherein the amount of spherical aberration SA is in the range from $[(-150.0 \cdot NA_F^4) \cdot \lambda] \leq SA \leq [(-48.0 \cdot NA_F^4) \cdot \lambda]$.

* * * * *